United States Patent [19]

Nakamura et al.

[11] 4,344,517
[45] Aug. 17, 1982

[54] CLUTCH RELEASE DEVICE

[75] Inventors: Takeshi Nakamura, Hiratsuka; Akihiko Tanaka, Fujisawa, both of Japan

[73] Assignee: Nippon Seiko Kabushiki Kaisha, Tokyo, Japan

[21] Appl. No.: 171,252

[22] Filed: Jul. 22, 1980

[30] Foreign Application Priority Data

Aug. 24, 1979 [JP] Japan .......................... 54-115892[U]
Sep. 27, 1979 [JP] Japan .......................... 54-132624[U]

[51] Int. Cl.³ .............................................. F16D 23/14
[52] U.S. Cl. .................................... 192/98; 192/110 B
[58] Field of Search .................... 192/98, 99 S, 99 A, 192/89 B, 91 A, 110 B, 110 R

[56] References Cited
U.S. PATENT DOCUMENTS

| | | | |
|---|---|---|---|
| 1,275,213 | 8/1918 | Bruce et al. ........................ | 192/89 R |
| 2,073,146 | 3/1937 | Gardiner ........................... | 192/89 B |
| 3,333,664 | 8/1967 | Chapaitis ........................... | 192/98 |
| 3,406,801 | 10/1968 | Root .................................... | 192/99 A |
| 3,625,327 | 12/1971 | Birdsey ............................ | 192/110 B |
| 4,036,338 | 7/1977 | Linn et al. ......................... | 192/98 X |

FOREIGN PATENT DOCUMENTS 50-154651 12/1975 Japan .

*Primary Examiner*—George H. Krizmanich
*Attorney, Agent, or Firm*—Shapiro and Shapiro

[57] ABSTRACT

A clutch release device comprises, in addition to a known clutch mechanism, a clutch release mechanism and holding means for the clutch release mechanism, a self-aligning mechanism capable of self-aligning the clutch mechanism and the clutch release mechanism during clutch release in a case where the clutch mechanism and the clutch release mechanism are eccentric with each other.

5 Claims, 8 Drawing Figures

4,344,517

CLUTCH RELEASE DEVICE

BACKGROUND OF THE INVENTION

1. Field of the Invention

This invention relates to a clutch release device for an automotive vehicle which is provided with a self-aligning or centering mechanism for automatically self-aligning the axis of a clutch mechanism and the axis of a clutch release mechanism.

2. Description of the Prior Art

A clutch release device usually includes a clutch mechanism, a clutch release mechanism and holding means for holding the clutch release mechanism in a predetermined position. The holding means has heretofore been provided on the transmission side (for example, on a bearing retainer fixed to the front of a transmission case), but from the viewpoints of its workability and finish accuracy, it has also been proposed to provide it on the engine side (Japanese Laid-open Patent Application No. 154651/1975).

However, no matter how the accuracy of the bearing has been improved, there has been eccentricity between the clutch mechanism and the clutch release mechanism (particularly between the torque transmitting member and the release bearing) to the accuracy of the parts constituting the device itself and the mounting error during assembly and therefore, abnormal slip occurs between the contact surfaces of the two to cause wear of such surfaces and moreover, discordant abnormal sound and the operation of the clutch pedal becomes heavy.

SUMMARY OF THE INVENTION

It is an object of the present invention to provide a clutch release device which enjoys the merit resulting from the holding means being provided on the engine side and which is capable of self-aligning the clutch mechanism and the release mechanism during clutch release when there is eccentricity between these two mechanisms. The self-aligning action is achieved by a newly added self-aligning mechanism, and such self-aligning mechanism is simple in construction and can be provided within a small space and moreover, it is low in cost and therefore, the provision of such self-aligning mechanism does not lead to bulkiness and substantially higher cost of the clutch release device.

The invention will become fully apparent from the following detailed description thereof taken in conjunction with the accompanying drawings.

DESCRIPTION OF THE PREFERRED EMBODIMENTS

Figure 1:
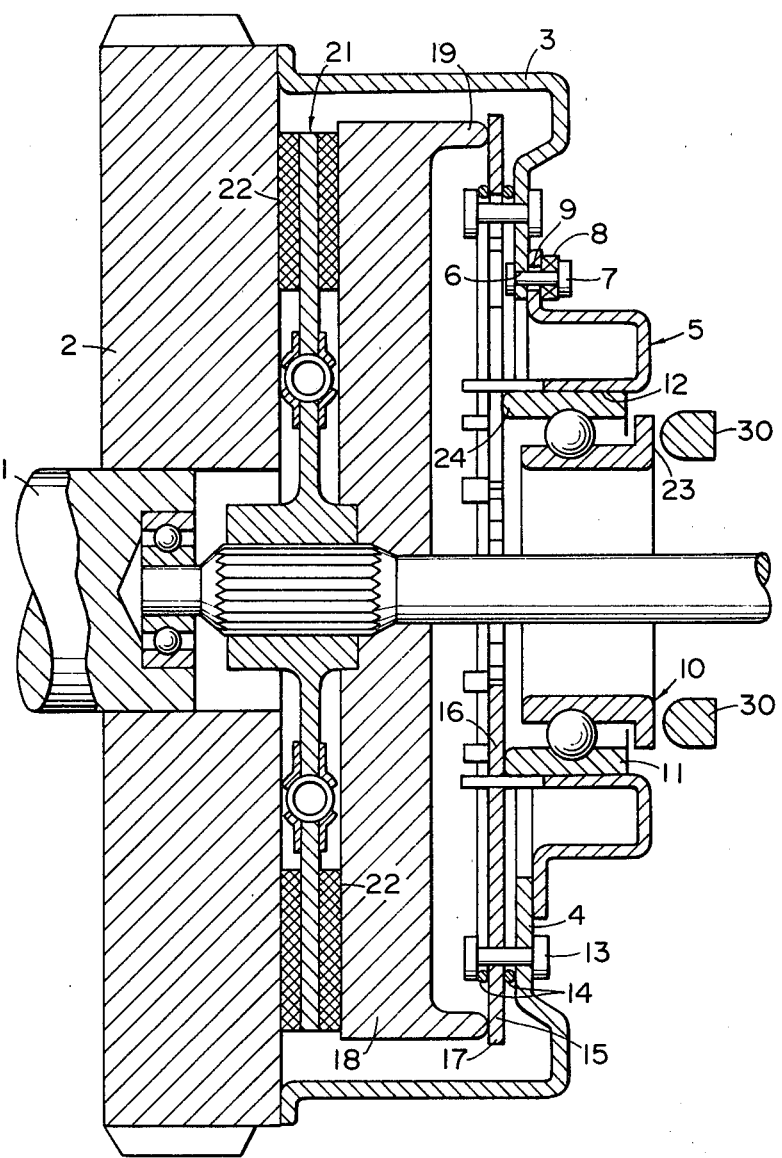
FIG. 1 is a longitudinal cross-sectional view showing a first embodiment of the present invention.

An embodiment of the present invention will hereinafter be described with reference to FIGS. 1 and 2. A clutch cover 3 is mounted on a fly-wheel 2 attached to an engine side crank-shaft 1. The clutch cover 3 has a flange portion 4 and on the circumference near the inside diameter thereof, there are provided a plurality of mounting holes 6 for mounting an auxiliary member 5. As shown in FIG. 2, through the holes 6 the auxiliary member 5 is connected to the flange 4 by pins 7 and resilient pressure members 8, and a supporting hole 9 of the auxiliary member 5 through which the auxiliary member engages the pin 7 is made slightly larger than the diameter of the pin 7.

The outer race 11 of a clutch release bearing 10 is fitted in the auxiliary member 5 at the axially slidable inside diameter portion 12 thereof.

On the outer periphery of the flange portion 4 of the clutch cover 3, a diaphragm spring 15 is mounted by means of a plurality of fulcrum pins 13 and a pivot ring 14, and the end face of the outer race 11 of the release bearing 10 is in contact with one side surface of the inner peripheral portion 16 of the diaphragm spring and the outer peripheral portion 19 of the pressure plate 18 of the clutch is in contact with the opposite side surface of the outer peripheral portion 17 of the diaphragm spring.

The other side surface 20 of the pressure plate 18 is opposed to the side surface 22 of the fly-wheel 2 with a clutch plate 21 interposed therebetween and constitutes an engine side rotation torque transmitting portion.

In the above-described clutch release device, during a normal condition (a condition in which a fork 30 is not acting), the pressure plate 18 is forced toward the fly-wheel 2 by the force of the diaphragm spring 15 whereby pressure is applied to the clutch plate 21 so that the torque is transmitted.

Figure 2:
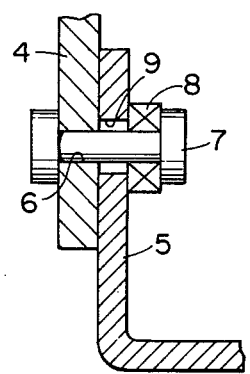
FIG. 2 is an enlarged view of portions in FIG. 1.

To disengage the clutch, the release fork 30 is pressed against the end face 23 of the inner race of the release bearing and the release bearing 10 slides on the inside diameter portion 12 of the auxiliary member 5 leftwardly as viewed in FIG. 1, and the end surface 24 of the outer race 11 presses the side surface of the inner peripheral portion 16 of the diaphragm spring to thereby flex said side surface toward the engine side.

However, since the outer peripheral side of the diaphragm spring is supported by the fulcrum pins 13 and pivot ring 14, the outer peripheral portion 17 of the diaphragm spring which is more adjacent to the outer periphery than the neighborhood of the fulcrum pins 13 is flexed toward the transmission side (rightwardly as viewed in FIG. 1), whereby the pressure force of the pressure plate 18 upon the clutch plate 21 is released to create a gap between the fly-wheel side surface 22 and the pressure plate side surface 20 and the clutch plate 21 and thus, the rotational torque is not transmitted.

In a case where such action occurs, if the center or rotation of the diaphragm spring 15 and the center of rotation of the bearing 10 are eccentric with each other when the end surface 24 of the outer race of the bearing is pressed by the inner peripheral portion 16 of the diaphragm spring, there is created a centripetal force acting on bearing 10 which tends to align the center of rotation of the bearing 10 with the center of rotation of the diaphragm spring, the centripetal force being transmitted to the auxiliary member 5 which supports the bearing. However, the auxiliary member 5 is frictionally engaged with the clutch cover 3 at the portion of the pins 7 by the resilient pressure members 8 and therefore, is moved with the bearing 10 to the center of rotation of the diaphragm spring 15 by said centripetal force and when it is self-aligned to a position in which the eccentricity has been corrected, the centripetal force becomes null and the auxiliary member is held at that position by the friction force of the resilient pressure members 8.

It will be seen that in the embodiment just described, the clutch release bearing is held by holding means comprising auxiliary member 5, connected to cover 3 of the clutch, and self-centering means 8, 9 is provided between the cover 3 and the holding means.

Figure 3:
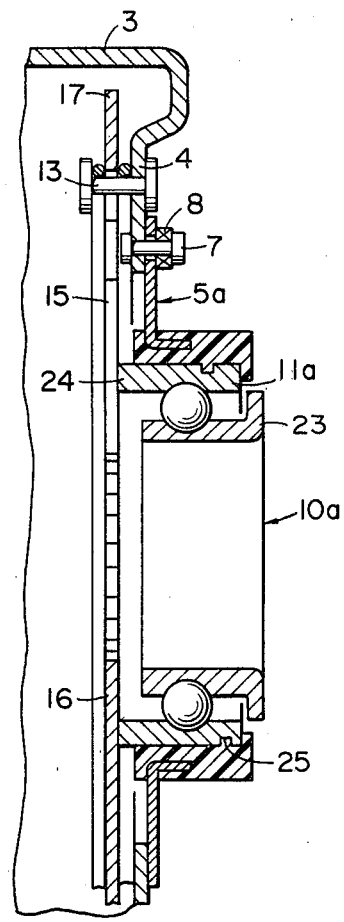
FIG. 3 is a cross-sectional view showing a modification of the clutch release mechanism.

FIG. 3 shows a modification of the clutch release mechanism in which the bearing holding portion of the auxiliary member is made of a resilient material such as synthetic resin, rubber or steel plate and the bearing is held by such holding portion. The auxiliary member 5a is formed so as to support the bearing while being resiliently deformed axially thereof when the bearing 10a is moved toward the engine side by said fork and again in this case, the auxiliary member 5a has a self-aligning mechanism similar to the previously described one, with respect to the clutch cover 3.

Figure 4:
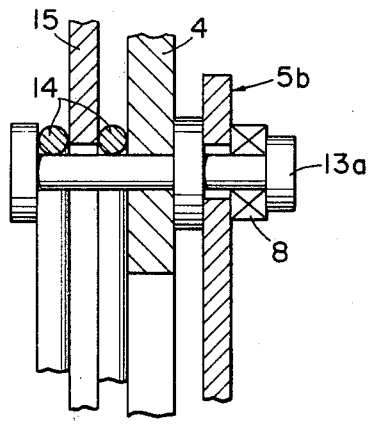
FIG. 4 is a cross-sectional view corresponding to FIG. 2 but showing a modification of the self-aligning mechanism.

FIG. 4 shows a modification of the self-aligning mechanism in which the auxiliary member 5b is commonly supported by a fulcrum pin 13a of the diaphragm spring 15.

In each of the examples described above, the auxiliary member 5, 5a, 5b supporting the bearing is automatically self-aligned (movable in all directions) with respect to the clutch cover and therefore, during clutch release, the auxiliary member is automatically self-aligned with the center of rotation of the diaphragm spring 15, whereafter it holds that position. Accordingly, the troubles which have resulted from the eccentricity in the prior art, namely, occurrence of vibration, abnormal sound and wear of the diaphragm spring and the outer race of the bearing, can be substantially prevented as can the problem that the pedal operation becomes heavy.

In each embodiment, the shape of the auxiliary member 5, 5a, 5b, the shape of the pins 7 and fulcrum pin 13, 13a and the material and shape of the resilient pressure member 8 may be suitably changed within the scope of the present invention as defined in the appended claims.

Also, the auxiliary member 5a may be formed by combining two or more types of materials, for example, securing the outer race 11a of the bearing by integral molding with the aid of synthetic resin having a resilient spring steel plate as a core. In this case, the outer race 11a of the bearing may be formed integrally with the auxiliary member 5a by providing an inclined groove 25 or a flange-like projection in the outside diameter of said outer race 11a, thereby forming a construction which will prevent creep.

The supporting portion of the clutch release bearing is formed as an assembly on the clutch cover side and this eliminates the necessity of providing the bearing retainer of the transmission case which has been required in the prior art and accordingly, the front portion of the transmission case can be made into a compact and light-weight construction and the number of machining steps and the cost can be greatly economized.

Further, this device of course permits the engine and the transmission to be arranged serially for use and also permits parallel arrangement of these and therefore has an advantage that in designing a vehicle, a great degree of freedom can be secured with respect to the arrangement of the engine and transmission.

Further, the embodiment of FIG. 1 adopts a construction in which the outer race 11 of the release bearing slides directly on the inside diameter 12 of the auxiliary member 5, but alternatively, a construction may be adopted in which other slide bushing is mounted on the outer race of the release bearing and the outside diameter of this slide bushing slides on the inside diameter 12 of the auxiliary member.

In the above-described embodiment, the clutch release bearing is of the outer race rotation type, but this may also be made into the inner race rotation type and may further be used as a type in which it performs a self-aligning operation for each clutch operation without using the resilient pressure member 8 of the self-aligning mechanism.

Figure 5:
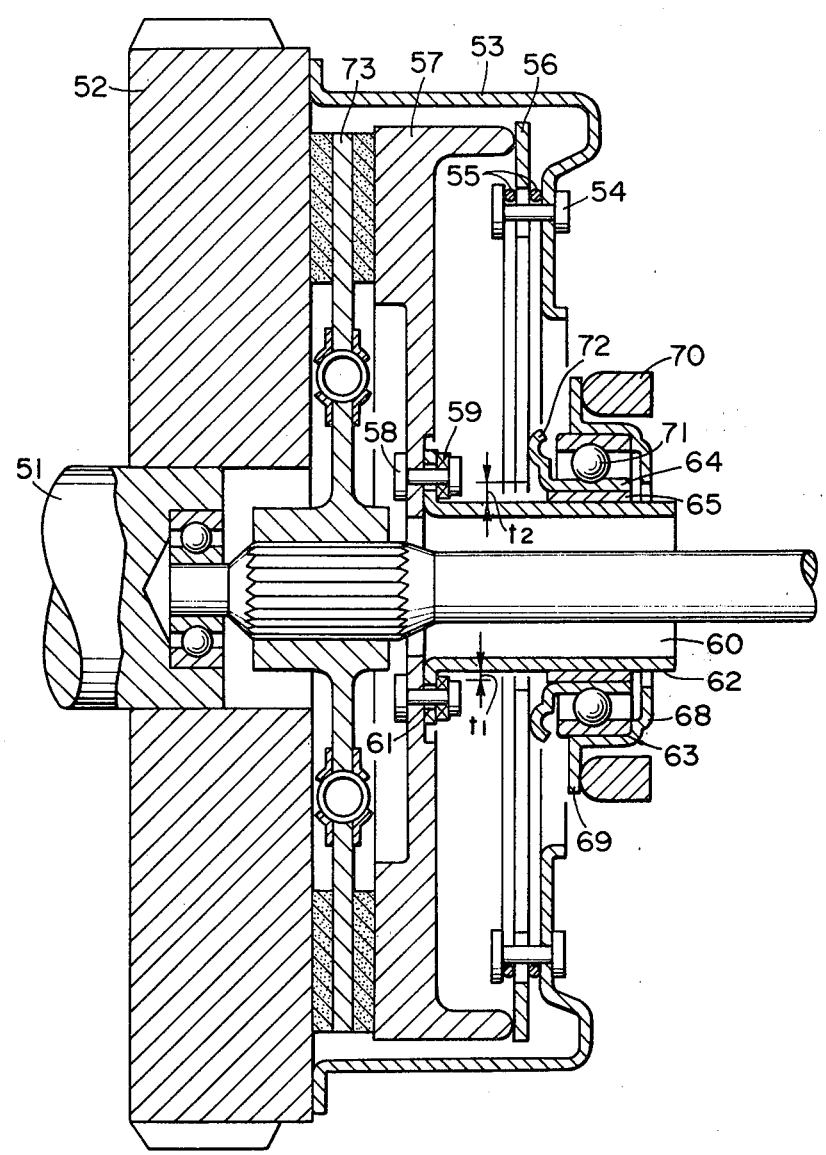
FIG. 5 is a cross-sectional view showing another embodiment of the present invention.
Figure 6:
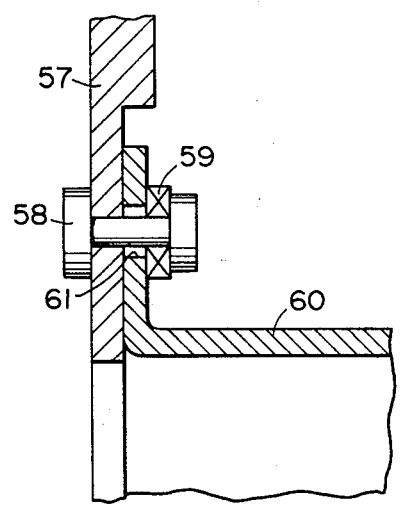
FIG. 6 is an enlarged view of portions in FIG. 5.

Reference is now had to FIGS. 5 and 6 to describe another embodiment of the present invention. A clutch cover 53 is mounted on a fly-wheel 52 connected to a crank-shaft 51, and a diaphragm spring 56 is mounted on the clutch cover 53 by means of support pins 54 and a pivot ring 55, and a pressure plate 57 in contact with the diaphragm spring is mounted on the other portion of the clutch cover 53 by means of a plate spring or the like.

An auxiliary member 60 is mounted on the end face of the pressure plate 57 by means of a plurality of pins 58 and a resilient pressure member 59 and, as shown in FIG. 6, the pin holes 61 of the auxiliary member which are engaged by the pins 58 are made larger than the diameter of the shank of the pin 58 and therefore, the auxiliary member 60 is somewhat movable radially relative to the pressure plate 57 and in this case, the gap $t_1$ between the pin 58 and the outside diameter portion 62 of the auxiliary member 60 and the gap $t_2$ between the inside diameter of the diaphragm spring 56 and the outside diameter portion 62 of the auxiliary member 60 are selected to suitable dimensions so that they do not interfere with each other.

Further, on the outside diameter portion 62 of the auxiliary member 60, a slide member 65 fitted to the inside diameter portion of the inner race 64 of a release bearing 63 is mounted for axial sliding movement.

An engaging member 68 is secured to the outer race 67 of said bearing 63, and the flange portion 69 thereof is in contact with a release fork 70 and is subjected to the pressure force during release operation and transmits the force to the inner race 64 through the outer race 67 and balls 71 and further, the pressure force acts on the diaphragm spring 56 which is in contact with the end face 72 of the inner race.

Figure 7:
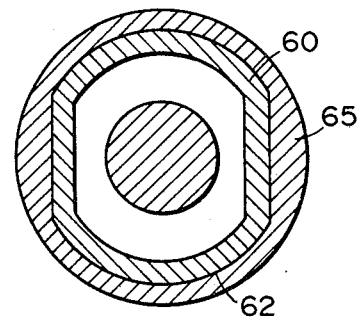
FIG. 7 is a transverse cross-sectional view of the auxiliary member 60 and slide member 65 in FIG. 5.

The outer peripheral portion 62 of the auxiliary member 60 is formed at two locations with parallel flat surfaces, as shown in FIG. 7, and the inside diameter of the slide member 65 is also formed into a similar cross-sectional shape and therefore, the two members are fitted to each other while being restrained in the direction of rotation.

In the so constructed clutch release device, in the normal case (a condition in which the clutch is connected), the end face 62 of the inner race of the release bearing is lightly urged and held against the side surface of the diaphragm spring 56 and the inner race 64 is normally rotated by rotation of the engine.

Next, in the case where the clutch is operated (the case where the clutch is disconnected), when the release fork 70 is first moved axially, the pressure force upon the engaging member 68 acts and the bearing 63 moves axially toward the engine side while being supported by the auxiliary member 60 and the end face 72 of the inner race strongly presses and flexes the end face of the diaphragm spring 56 which is adjacent to the inside diameter thereof. Thus, the outer peripheral portion of the diaphragm spring 56 is reversed and flexed in the opposite direction from the engine and therefore, the pressure force (clutch tightening force) of the pressure plate 57 upon the clutch plate 73 becomes null and the clutch is disconnected. Again in this case, the previously described self-aligning operation is performed, but this need not be described in detail because it has already been described.

Figure 8:
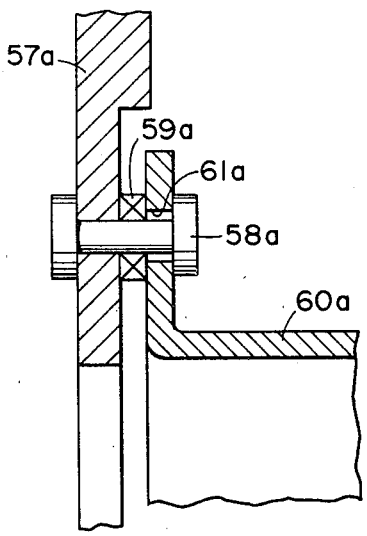
FIG. 8 is a cross-sectional view showing a modification of FIG. 1.

FIG. 8 shows a modification in which a resilient pressure member 59a is mounted intermediate of a pressure plate 57a and an auxiliary member 60a. In this case, if a material such as heat-resistant rubber having a high adiabatic effect is used for the resilient pressure member 59a, there will be the effect of preventing the heat conduction from the pressure plate side.

The resilient pressure member 59 in the embodiment may be in the form of a spring member such as dish spring, plate spring or coil spring and the material thereof may be suitably selected from among rubber, synthetic resin, etc.

In the embodiment, the pin holes 61 having a larger diameter than the shank diameter of the pins 58 are provided in the auxiliary member 60, but alternatively, such pin holes may be provided in the pressure plate 57 or both in the auxiliary member and the pressure plate.

Further, in the above-described embodiment, the slide member 65 is mounted on the inner race 64 of the release bearing, but alternatively, this may be slid directly on the inner race 64 of the bearing.

Also, in the above-described embodiment, two flat surfaces are provided in the axial cross-section of the surfaces of the slide member 65 and the auxiliary member 60 which are fitted to each other, whereas, for example, on such flat surface may be provided or a key and a key groove may be formed to accomplish the engagement between the two members.

As described above, the auxiliary member 60 supporting the release bearing is provided with a mechanism automatically self-aligned with respect to the pressure plate 57 and therefore, even if the diaphragm spring 56 and the release bearing 63 are eccentric with each other, the bearing is automatically self-aligned as previously described.

What we claim is:

1. A clutch assembly comprising a clutch device including a clutch plate adapted to cooperate with a fly-wheel, a pressure plate, and a clutch cover fixed to the fly-wheel to cover the clutch plate and the pressure plate; a clutch release device including a release bearing; holding means for the release bearing connected to the clutch device; and a self-centering means compensating for eccentricity between the clutch device and the clutch release device and for holding the clutch release device in a self-centered position, the self-centering means being provided between the clutch device and the holding means so that the clutch release device and the holding means may be moved together to the self-centered position.

2. A clutch assembly according to claim 1, wherein said holding means is an auxiliary member connected to said clutch cover.

3. A clutch assembly according to claim 1, wherein said holding means is an auxiliary member held on said pressure plate.

4. A clutch assembly according to claim 2, wherein said auxiliary member is supported in intimate contact with said clutch cover through a resilient member forming part of the self-centering means.

5. A clutch assembly according to claim 1, wherein the self-centering means is provided between the clutch cover and a part of said holding means which is radially displaceable on the clutch cover.

* * * * *